J. L. BECK.
SAFETY CRANKING DEVICE FOR EXPLOSIVE ENGINES.
APPLICATION FILED NOV. 4, 1910. RENEWED AUG. 16, 1911.
1,046,947.
Patented Dec. 10, 1912.
2 SHEETS—SHEET 1.
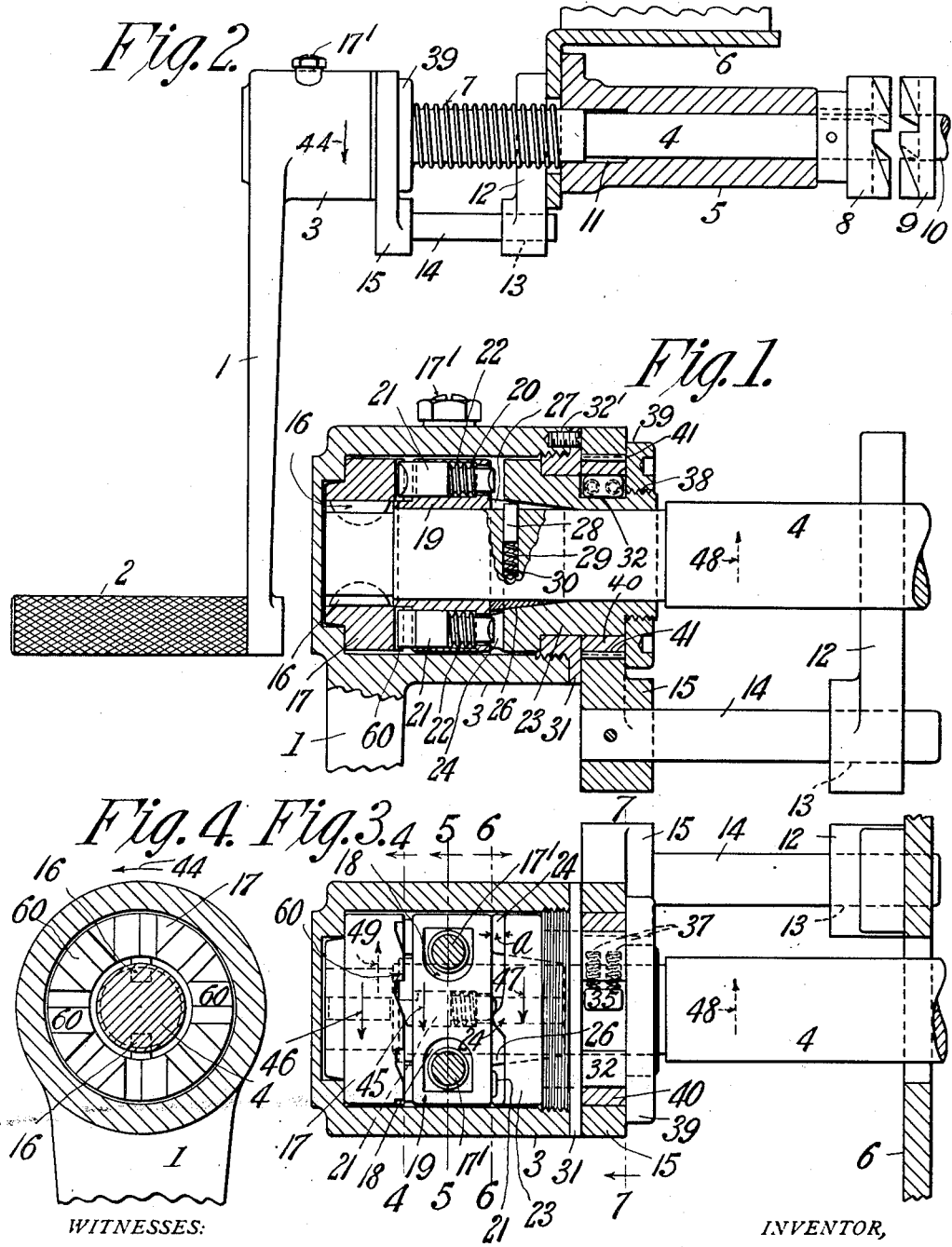
WITNESSES:
H. L. Sprague
R. M. Mowry
INVENTOR,
John L. Beck,
BY
Wm. S. Bellows
ATTORNEY.

J. L. BECK.
SAFETY CRANKING DEVICE FOR EXPLOSIVE ENGINES.
APPLICATION FILED NOV. 4, 1910. RENEWED AUG. 16, 1911.
1,046,947.
Patented Dec. 10, 1912.
2 SHEETS—SHEET 2.
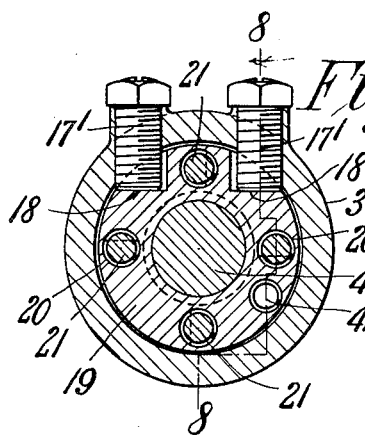
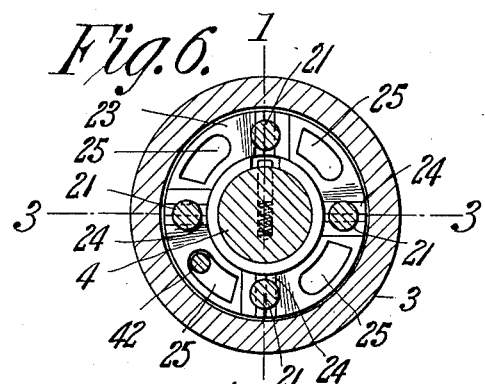
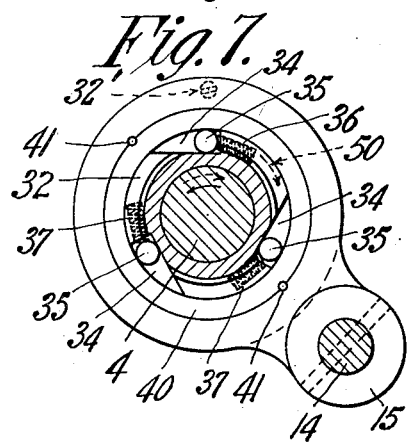
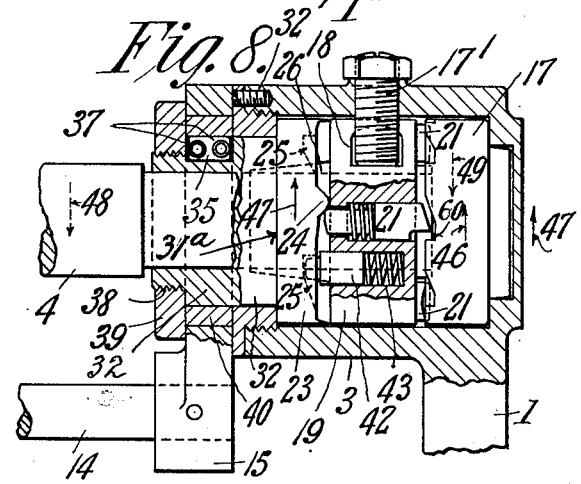
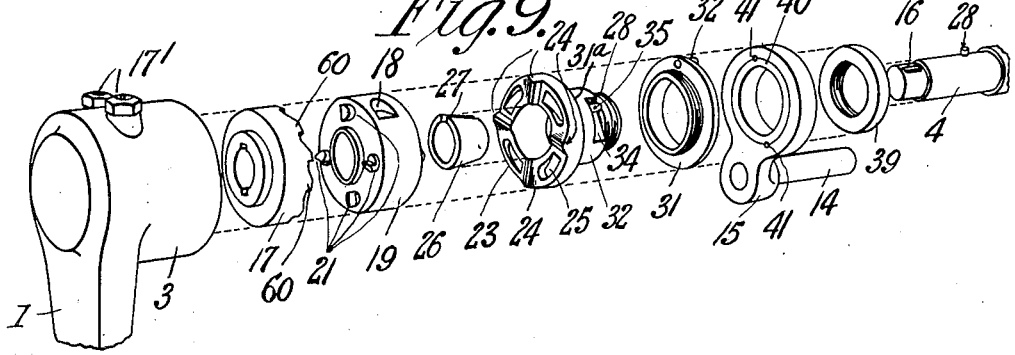
WITNESSES:
INVENTOR,
John L. Beck,
BY
ATTORNEY.

UNITED STATES PATENT OFFICE.

JOHN L. BECK, OF SPRINGFIELD, MASSACHUSETTS, ASSIGNOR, BY MESNE ASSIGNMENTS, TO AUTO SAFETY CRANK COMPANY, OF HOLYOKE, MASSACHUSETTS, A CORPORATION OF MASSACHUSETTS.

SAFETY CRANKING DEVICE FOR EXPLOSIVE-ENGINES.

1,046,947.      Specification of Letters Patent.      Patented Dec. 10, 1912.

Application filed November 4, 1910, Serial No. 590,687. Renewed August 16, 1911. Serial No. 644,452.

*To all whom it may concern:*

Be it known that I, JOHN L. BECK, a citizen of the United States of America, and resident of Springfield, in the county of Hampden and State of Massachusetts, have invented certain new and useful Improvements in Safety Cranking Devices for Explosive-Engines, of which the following is a full, clear, and exact description.

This invention relates to improvements in the starting or cranking mechanism for explosive gas engines, of a kind in which is assured a separation of the crank from the engine shaft when the speed of the latter, as occasioned by the running of the engine in the forward direction, becomes greater than the manually imparted revolution of the crank.

The principal object of the invention is to provide improved means for the separation of the crank from the engine shaft in case the engine acquires a backward running motion by reason of any improper conditions accidental on the part of the operator or beyond his power of control so that the possibility of injury to the operator in case of a "back-kick" is, with certainty, guarded against.

Another object is to provide a safety cranking device so designed and constructed as not to interfere with the bearings of the crank and in which the several members by simple and cheaply constructed parts are reliably retained in their coacting relations. And another object, which is of considerable importance, is to so construct and organize the device that the hub of the crank forms a casing to conceal and protect the principal operative parts, the crank and safety device having the external aspect of the most ordinary form of simple crank.

The invention is described in conjunction with the accompanying drawings and set forth in the claims; and in said drawings:—

Figure 1 is a sectional side elevation taken on the line 1—1, Fig. 6. Fig. 2 is a side elevation in partial section showing the external proportions of the crank and its attachment to the frame of the car together with a portion of the engine shaft itself. Fig. 3 is a plan sectional view of the safety mechanism portion of the crank taken on the line 3—3, Fig. 6. Fig. 4 is a sectional end elevation taken on the line 4—4, Fig. 3, showing the driving ratchet. Fig. 5 is a transverse sectional view taken on the line 5—5, Fig. 3. Fig. 6 is a transverse sectional view taken on the line 6—6, Fig. 3. Fig. 7 is a sectional view taken on the line 7—7, Fig. 3. Fig. 8 is a side elevation in partial section taken on the line 8—8, Fig. 5, and as seen in the direction of the arrow adjoining the section line. Fig. 9 is a dismembered perspective view showing the parts of the mechanism in proper assembling position relative to each other.

In the drawings, 1 represents the crank to which is secured the handle 2, and in the oppositely disposed hub end 3 is mounted a cranking shaft 4 which has its bearing or support rigidly secured to the frame 6. Mounted on the shaft 4 is a spring 7 which by an inward pressure of the hand lever 1 engages the locking ratchet 8 with the similar locking ratchet 9 mounted on the end of the engine shaft 10 in the usual manner. In the bearing 5 is provided a recessed portion 11 sufficient to receive the enlarged portion of the shaft 4 when it becomes necessary to "crank" the engine. Securely mounted on the frame 6 is a bracket 12 which has provided therein an opening 13 which receives a portion of the dowel 14, the other end of which is securely fixed to a collar 15, the member 14 having sliding engagement through the opening 13 at such times as it becomes necessary to start the engine. Rigidly mounted on the cranking shaft 4 is a flange like portion thereof, and secured by the keys 16 is a member 17 having on its face cam shaped or ratchet like teeth 60; and securely attached within the hub 3 of the crank lever by the locking screws 17' engaging in a cut away portion 18 is a collar 19 provided, parallel with its axis, with several regularly spaced cylindrical openings 20 which have mounted therein the locking dogs 21 held in a normally outward distended position by the springs 22 against the ratchet 17. Mounted on the shaft 4 and adjacent the collar 19 is another oppositely disposed face ratchet 23 on the face of which is provided several cam shaped teeth 24 extending in a direction toward the collar 19. Between the teeth 24 are provided an equal number of cam shaped indentations 25. The annular ratchet faced member 23 is held in frictional relation to the shaft 4 by the intervention of a conically formed ring 26 provided with a cleft 27 and driven by the shaft 4 by the engagement of a locking pin 28 placed in an opening 29 in the shaft and held in an outwardly distended relation thereto by the spring 30. The member 23 has the opening therein made flaring toward one end to receive the split conical frictioning collar 25. The member 23 is loosely mounted in the hub of the crank 3 and held therein against movement in one direction by a flanged ring nut 31 which screw engages in the hub, has its end in engagement with the shoulder 31ª produced on the annular member 23 by making different portions of the latter of different diameters. The ring nut is held in fixed relation to the crank hub by the screw 32'. The extremity of the member 23 which is of still further reduced diameter is screw threaded and protrudes parallel with the axis of the device through and beyond the bushing 40 of the collar or yoke like part 15 and receives the spanner nut 39 which in the assemblage of the parts is set up against the face of the collar or yoke. And it is to be perceived by reference to the sectional view, Fig. 1, that the construction and assemblage of the parts are such that the distance between the cam provided faces of the members 23 and 17 are constantly maintained. Within the periphery of the diametrically reduced end portion 32 of the annular member 23 are formed a plurality of pockets 34 having tangential bases to receive the rollers 35 which are normally located in the larger ends of the pockets 34, and have associated therewith the spiral springs 36 which for the greater portion of their lengths are inclosed in the drilled holes or pockets 37. The collar or yoke 15 having a hardened bushing 40 held therein by the keys or locking pins 41 surrounds the tangentially recessed part of the annular member 23 and makes in coöperation with the pawl rollers 35 in the recessed part 32 a silent pawl and ratchet. The necked down and externally screw threaded end portion 38 of the annular member 23 which protrudes through the collar or yoke 15 receives the ring nut 39 thereon.

Referring to Figs. 6 and 8, it will be seen that the collar 19 is provided with a single dog 42 held in an outwardly distended relation toward the cam faced ratchet teeth of the part 23 by the spring 43 and for engagement with some one of the indentations 25 which have the shape of ratchet teeth with abrupt shoulders at one end, and which serve to place, when the crank is initially revolved, the cam shaped ratchet teeth 24 in rectified opposition to the oppositely facing teeth on the part 17 carried by the cranking shaft.

Referring to Fig. 3 it will be seen that by a movement of the crank hub 3 in the direction of the arrow 45 the collar 19 is caused to revolve about the shaft 4 in the direction of the arrow 45 through the driving screws 17', with the result that the driving dogs 21 are forced away from the cam 17; but as the cam shaped projections 24 of the face cam 23 are so positioned relative to the locking dog 21 that the opposite end of the locking dog 21 impinges against the same and prevents a lateral displacement of such dog, the cam 17 is caused to revolve in the direction of the arrow 46.

Referring to Fig. 8 it will be seen that the single locking dog 42 drives the cam 23 in the direction of arrow 47 against its frictional contact with the shaft through the intervention of the conical shaped wedge 26.

By the above described means it will be clearly seen that a buttress is provided by the face cams 23 and 17 whereby it becomes impossible for the driven member, namely the collar 19, to pass beyond a locked position as illustrated in Fig. 3, at which time the crank causes the cam 17 to drive the shaft 4 and its ratchet 8 engaged in the locking ratchet 9 against the compression of the engine, thereby starting the motor. At the moment the speed of the motor increases beyond the speed of the crank, the same will disengage itself therefrom by disengaging the two ratchets 8 and 9 in the usual manner; and the shaft 4 will be thrust outward away from the same by the aid of the spring 7.

In the event of a "back fire" of the engine the engine shaft 10 becomes the driver and because the ratchets 8 and 9 are locked together the shaft 4 will be revolved in the opposite direction from which the engine would normally run, and on account of the necessary shape of the ratchets 8 and 9 the shaft 4 becomes the driver in the direction of the dotted arrow 48 which causes the ratchet 17 to be driven in the direction of the dotted arrow 49. Coincident with the "kick back" of the engine the frictional cone 26 causes the face cam 23 to be revolved in the direction indicated by the dotted arrow 50, Fig. 7, which by the peripheral contact on the rollers thrusts such rollers into an impinging or wedging position relative to the collar 40, maintaining the face cam 23 in a stationary position relative to the circular collar portion 15 which is held against backward rotation by the pin 14.

It will be understood, therefore, that the face cam 23 is capable of revolving in one direction only, namely, that in which the engine is running; and as the cam 17, keyed to the shaft 4, is now revolving in the direction of the arrow 49, Fig. 8, the existing relation of parts 17 and 23 is destroyed and the backward rotation of the cam 17 thrusts the locking dog 21 toward the face cam 23, and when the cam shaped extensions 24 are in line with those of the cam 23, the latter through the dogs will be forced forwardly around or in the direction of the arrow 47, Fig. 8, thereby permitting the locking dog to have positions of clearance as the collar 19 and the cam 23, indicated on Fig. 3, are separated by a distance indicated by the witness lines $a$, so that the members 17 and 23 have such relations relatively to the lengths of the dogs 21 that the difference between the points of the cam like projections or teeth on one member and the base of such teeth on the other member is greater than the length of the dog, while the distance between the salient points of the cam shaped teeth of both members is less than the length of the dogs, and thus, on the backward turning of the cranking shaft caused by a kick back of the engine there is, with certainty, a release of all connection between the cranking shaft and the crank. Therefore, the operator may retain the cranking handle in his hand with perfect safety and with only such force of grasp as to resist the frictional engagement between certain of the parts.

Due acknowledgment is herein made of subject matter described and claimed in a co-pending application for Letters Patent of the United States filed by me under date of Feb. 24, 1911, Serial No. 615,676.

I claim:—

1. In a safety cranking device for explosive engines, in combination, a cranking shaft having a fixed flange like member provided on its face with a series of cam shaped teeth, an annular member encircling and in frictional engagement with the cranking shaft and revoluble forwardly therewith, and having a set of cam shaped teeth in opposition to and facing those of the shaft carried member, means for preventing a backward rotation of such annular member, and a crank having at its hub an internal collar located between and with its opposite faces in proximity to the aforementioned cam toothed members provided with a series of dogs mounted and endwise movable therein, and parallel with the axis thereof, which have their opposite ends protruding therefrom for coaction with the cam shaped teeth of the aforesaid opposite members.

2. In a safety cranking device for explosive engines, in combination, a cranking shaft having a fixed flange like member provided on its face with a series of cam shaped teeth, an annular member encircling and in frictional engagement with the cranking shaft and revoluble forwardly therewith, and having a set of cam shaped teeth in opposition to and facing those of the shaft carried member, means for preventing a backward rotation of such annular member, a crank having at its hub an internal collar located between and with its opposite faces in proximity to the aforementioned cam toothed members provided with a series of dogs mounted and endwise movable therein, and parallel with the axis thereof, which have their opposite ends protruding therefrom for coaction with the cam shaped teeth of the aforesaid opposite members, and means for securing on the initial revoluble movement of the crank the positioning of the cam shaped teeth of both sets in opposition with each other.

3. In a safety cranking device, in combination, a cranking shaft having a fixed flange like part provided on its face with a series of cam shaped teeth, an annular member encircling and in frictional engagement with the cranking shaft having a set of cam shaped teeth in opposition to and facing those of the shaft carried member, a non-rotative ring encircling said annular member and relatively to which the latter may rotate freely in a forward direction, and means for preventing a rotation of such member backwardly relatively to said ring, and a crank having at its hub an internal collar located between and with its opposite faces in proximity to the aforementioned cam toothed members having a series of dogs mounted and endwise movable therein, and parallel with the axis thereof, having their opposite ends protruding therefrom for coaction with the cam shaped teeth of the aforesaid opposite members.

4. In a safety cranking device, in combination, a cranking shaft having a fixed flange like part provided on its face with a series of cam shaped teeth, an annular member encircling and in frictional engagement with the cranking shaft having a set of cam shaped teeth in opposition to and facing those of the shaft carried member, a non-rotative ring encircling said annular member and relatively to which the latter may rotate freely in a forward direction, and means for preventing a rotation of such member backwardly relatively to said ring, a crank having at its hub an internal collar located between and with its opposite faces in proximity to the aforementioned cam toothed members having a series of dogs mounted and endwise movable therein, and parallel with the axis thereof, having their opposite ends protruding therefrom for coaction with the cam shaped teeth of the aforesaid opposite members, and means for securing on the initial revoluble movement of the crank the positioning of the cam shaped teeth of both sets in opposition with each other.

5. In a safety cranking device for explosive engines, in combination, a cranking shaft having a fixed flange like member provided on its face with a series of cam shaped teeth, an annular member encircling and in frictional engagement with the cranking shaft and revoluble forwardly therewith, and having a set of cam shaped teeth in opposition to and facing those of the shaft carried member, and also having at its face a ratchet like formation, means for preventing a backward rotation of such annular member, and a crank having at its hub an internal collar located between and with its opposite faces in proximity to the aforementioned cam toothed members provided with a series of dogs mounted and endwise movable therein, and parallel with the axis thereof, which have their opposite ends protruding therefrom for coaction with the cam shaped teeth of the aforesaid opposite members, and also provided with a spring pressed pawl for engagement with the ratchet formed part of the said annular member.

6. In a safety cranking device, in combination, a cranking shaft having a fixed flange like member provided on its face with a series of cam shaped teeth, an annular member encircling and in frictional engagement with the cranking shaft and revoluble forwardly therewith, and having a set of cam shaped teeth in opposition to and facing those of the shaft carried member, means for preventing a backward rotation of such annular member, a crank provided with a hollow hub, and provided with an internal collar located between, and with its opposite faces in proximity to, the aforementioned cam toothed members, provided with a series of dogs mounted and endwise movable therein, and parallel with the axis thereof, which have their opposite ends protruding therefrom for coaction with the cam shaped teeth of the aforesaid opposite members, the hub of the crank inclosing, and forming a casing for, the flange provided portion of the shaft, its internal collar and its equipments, and the said annular member.

7. In a safety cranking device, in combination, a cranking shaft having a fixed flange like part which is provided on its face with a series of cam shaped teeth, an annular member spaced from said flange like part, encircling the cranking shaft having a set of cam shaped teeth in opposition to and facing those of the shaft carried member, and having the circular opening therethrough flaring at one end portion thereof, a split conical frictioning sleeve, non-rotatively engaged with the shaft, and engaging in the flaring opening in the annular member, a non-rotative ring encircling said annular member and relatively to which the latter may rotate freely in a forward direction, and means for preventing a rotation of such member backward relatively to said ring, and a crank having at its hub an internal collar located between and with its opposite faces in proximity to the aforementioned cam toothed members having a series of dogs mounted and endwise movable therein, and parallel with the axis thereof, having their opposite ends protruding therefrom for coaction with the cam shaped teeth of the aforesaid opposite members.

8. In a device of the character described, in combination, a cranking shaft having a fixed flange like part which is provided on its face with a series of cam shaped teeth, an annular member spaced from said flange like part, encircling the cranking shaft, having a set of cam shaped teeth on its end face in opposition to those of the shaft provided flange like member, and said annular member having portions thereof of different diameters whereby a shoulder is produced, a crank having a hollow cylindrical hub enclosing a portion of the cranking shaft and a portion of the length of the annular member, and having an internal collar located between the aforementioned cam toothed members, having a series of dogs endwise movable therein, the opposite ends of which protrude beyond the end faces of the collar for coaction with said cam shaped teeth, a flanged ring nut internally screw engaged in the end portion of the hub and having an engagement with the shoulder of said annular member, a non-rotative ring encircling a portion of the annular member beyond the end of the hub and means for preventing the rotation of the annular member backwardly relatively to said ring.

9. In a device of the character described, in combination, a cranking shaft having a fixed flange like part which is provided on its face with a series of cam shaped teeth, an annular member spaced from said flange like part, encircling the cranking shaft, having a set of cam shaped teeth on its end face in opposition to those of the shaft provided flange like member, and said annular member having portions thereof of different diameters whereby a shoulder is produced, a crank having a hollow cylindrical hub inclosing a portion of the cranking shaft and a portion of the length of the annular member, and having an internal collar located between the aforementioned cam toothed members, having a series of dogs endwise movable therein, the opposite ends of which protrude beyond the end faces of the collar for coaction with said cam shaped teeth, a flanged ring nut internally screw engaged in the end portion of the hub and having an engagement with the shoulder of said annular member, a non-rotative ring encircling a portion of the annular member beyond the end of the hub, and beyond which the extremity of the annular member protrudes, a ring detachably confined on the extremity of the annular member and having an overlapping relation to the face of the non-rotative ring, and means for preventing the rotation of the annular member backwardly relatively to said ring.

10. In a safety cranking device, in combination, an engine shaft having a ratchet toothed member on its end, and a fixture adjacent the end of the engine shaft, a cranking shaft endwise movable relatively to the engine shaft having its end adjacent the engine shaft ratchet toothed extremity and provided at its other end with a flange like member provided on its face with a series of cam faced teeth, an annular member encircling and in frictional engagement with the cranking shaft, and forwardly revoluble therewith, and having a set of cam shaped teeth on its end, a crank having at its hub an internal collar located between the cam toothed faces of said annular member and of said flange like shaft-carried member and provided with a series of dogs arranged endwise movable parallel with its axis which have their opposite ends in coactive relations to the cam shaped teeth of the aforesaid members, a collar encircling an extremity of the said annular member which protrudes beyond the end of the hub and which has a dowel-and-socket engagement with the aforesaid fixture, and pawl and ratchet devices between the annular member and the last named collar for preventing backward rotative movement of the annular member.

Signed by me at Springfield, Mass., in presence of two subscribing witnesses.

JOHN L. BECK.

Witnesses:
 G. R. DRISCOLL,
 WM. S. BELLOWS.